United States Patent [19]

Harriman et al.

[11] E Re. 30,714

[45] Reissued Aug. 18, 1981

[54] REMOVAL OF COPPER CONTAINING INCRUSTATIONS FROM FERROUS SURFACES

[75] Inventors: Lester W. Harriman, Angleton; Paul E. Muehlberg, Jackson, both of Tex.; Fred N. Teumac, Charlotte, S.C.

[73] Assignee: The Dow Chemical Company, Midland, Mich.

[21] Appl. No.: 942,208

[22] Filed: Sep. 14, 1978

Related U.S. Patent Documents

Reissue of:

[64] Patent No.: 3,438,811
Issued: Apr. 15, 1969
Appl. No.: 497,530
Filed: Oct. 18, 1965

U.S. Applications:

[63] Continuation-in-part of Ser. No. 387,481, Aug. 4, 1964, abandoned.

[51] Int. Cl.[3] ..... C23G 1/14
[52] U.S. Cl. ..... 134/2; 134/29
[58] Field of Search ..... 134/2, 29; 252/80, 82, 252/156

[56] References Cited

U.S. PATENT DOCUMENTS

| | | | |
|---|---|---|---|
| 1,050,678 | 1/1913 | Moreno . | |
| 2,257,186 | 9/1941 | Orthner et al. | 252/105 |
| 2,396,938 | 3/1946 | Bersworth | 134/2 |
| 2,544,649 | 3/1951 | Bersworth | 23/184 |
| 2,567,835 | 9/1951 | Alquist et al. | 134/2 |
| 2,802,788 | 8/1957 | Flaxman | 252/105 |
| 2,959,555 | 11/1960 | Martin et al. | 252/149 |
| 3,033,214 | 5/1962 | Bersworth et al. | 134/13 |
| 3,067,070 | 12/1962 | Loucks | 134/27 |
| 3,072,502 | 1/1963 | Alfano | 134/3 |
| 3,248,269 | 4/1966 | Bell | 148/6.14 |
| 3,308,065 | 3/1967 | Lesinski | 252/82 |

OTHER PUBLICATIONS

Alfano et al., *Proceedings Intnl. Water Conf.*, "Chemical Removal of Magnetite and Copper", 1961, pp. 41–51.
Narcus, *Metal Finishing*, 1952, pp. 54–61.
Geigy, *Sequestrene Tech. Bull.*, 1952, pp. 2, 3, 27, 50.
Loucks, *Power*, "Sequestrants Play Vital Role in Modern Chemical Cleaning", vol. 105–No. 12, 12–1961, pp. 186–189.
Viacova et al., *Teploenorgetika*, "Investigation of Solution of Boiler Deposits with Complex Forming Reagents", No. 11, 1962, pp. 69–74.
Loucks, *Chem. Engnr.*, "Chemistry Tackles Plant Maintenance", 3–5–62, pp. 103–120.
Bersworth Chem. Co., *Versene Tech. Bull.*, 1954.

*Primary Examiner*—Marc L. Caroff
*Attorney, Agent, or Firm*—Bruce M. Kanuch

[57] ABSTRACT

*The invention concerns a method of removing copper from a ferrous metal surface without excessive corrosion of the ferrous metal surface. In the method, the copper is dissolved with an aqueous alkaline solution containing a ferric chelate of an alkylene polyamine polyacetic acid chelating agent.*

26 Claims, No Drawings

REMOVAL OF COPPER CONTAINING INCRUSTATIONS FROM FERROUS SURFACES

Matter enclosed in heavy brackets [ ] appears in the original patent but forms no part of this reissue specification; matter printed in italics indicates the additions made by reissue.

This application is a continuation-in-part of U.S. patent application Ser. No. 387,481, now abandoned.

This invention concerns the removal of plated copper from a ferrous surface.

It has long been desired to be able to remove plated copper from a ferrous surface, e.g., steel, without also oxidizing excessively the iron thereof. This problem has been especially difficult and economically costly in the removal of plated copper from the internal metal surfaces of steam generating equipment, particularly high pressure steam generating equipment, which is operated in connection with a condenser, the condensing surfaces of which are of copper alloy.

In the operation of high pressure steam generating equipment (over 600 pounds per square inch steam pressure) in which the feed water is largely returned condensate from a copper alloy condenser, incrustations are usually produced upon the steam generating surfaces of the steam generator despite the fact that the feed water is substantially pure. These incrustations oftentimes contain copper, both in metallic form and combined with oxygen, corroded from the copper alloy condenser by the action of the condensed steam which carries the copper to the steam generator.

Attempts to remove such incrustations, as by the use of conventional acidizing procedures, are not wholly successful. Tests have shown that by acidizing incrusted steam generating surfaces of the usual high pressure steam generator, having copper in the incrustations, some of the copper is removed from the incrustations and some of the copper so-removed is redeposited elsewhere on the surfaces of the steam generating equipment during the acidization so that only a partial net removal of copper from the incrusted surfaces results. Insofar as is known, there is no completely satisfactory method commercially available for treating the internal ferrous metal surfaces of high pressure steam generating equipment subject to deposition of copper-containing incrustations so as to free the surfaces of the incrustations and the copper. Accordingly, it is an object of the invention to provide a method fulfilling this need. Other objects and advantages will become apparent as the description of the invention proceeds.

It has now been discovered that an aqueous solution of a ferric chelate of a polycarboxylic acid chelating agent alone or together with some free polycarboxylic acid chelating agent when adjusted to an alkaline pH, i.e., in excess of 7 and up to about 10, by combination with ammonia, an amine or a hydroxyalkylamine or one or more of the preceding in amount of at least 50 mole percent in combination with up to 50 mole percent of an alkali metal hydroxide, is quite effective in dissolving plated copper from ferrous surfaces, e.g., of high pressure steam boiler surfaces.

The chelating agents used in the practice of this invention as their ferric chelates and, if desired, in combination with ammonium and amine salts of the aforementioned polycarboxylic acid chelating agents are those of alkylene polyamine polyacetic acid (APAPAA), e.g., ethylenediaminetetraacetic acid (EDTA), N-hydoxyethylethylenediaminetriacetic acid (NHEDTA); nitrilotriacetic acid (NTA) and N-2-hydroxyethyliminodiacetic acid (OHEtIDA); diethylenetriaminepentaacetic acid (DTPA); and mixtures thereof, hereinafter referred to broadly as polycarboxylic acid chelating agents.

In practice, a ferrous metal surface on which copper has plated out, e.g., that of a high pressure boiler, is heated at a temperature above room temperature and up to about 300° F. in the presence of an aqueous solution of a ferric chelate of a polycarboxylic acid chelating agent, if desired also containing free chelating agent, which solution is adjusted to an alkaline pH up to about 10 with ammonia and/or an amine or alkanolamine and with up to a 50 mole percent proportion of an alkali metal hydroxide, if desired. The resulting salts will hereinafter be referred to as ammonium and amine salts of said chelating agents. A solution containing a total of about 0.5 weight percent polycarboxylic acid as iron chelate and, if desired, as ammonium and/or amine salt of said polycarboxylic acid up to a saturated solution thereof can be used. The weight proportion of iron chelate of the total of free and chelated chelating agent, i.e., degree or percent spentness, can be varied from between about 60 to about 100 percent.

It appears that the solution containing ferric chelate oxidizes the copper metal to copper ions ($Cu^{++}$ and $Cu^{+}$) which react with the resulting ferrous chelate or with the free, i.e., uncomplexed or salt-form, chelating agent therein to form a copper chelate, and after a sufficient reaction time, as determined by analysis of the treating solution, the plated copper is dissolved. However, we do not wish to be bound by this theory. As reaction proceeds, the ferric chelate is reduced to a ferrous chelate. This "reduction" would progressively slow the copper-dissolving reaction. In order to maintain a useful level of ferric chelate, i.e., some of the iron chelate must be in the ferric form, it has been found necessary to add an oxidizing agent to the copper-dissolving ferric chelate-containing solution so that ferrous chelate formed when the plated copper is oxidized to copper ions is reoxidized to ferric chelate for continued oxidation and subsequent dissolution of copper. This may be done by continuously or periodically monitoring or analyzing the copper-dissolving solution and adding an oxidant such as hydrogen peroxide, water-soluble salts such as alkali metal or ammonium nitrites, permanganates, persulfates, or perchlorates; or such gaseous oxidants as nitrogen tetraoxide, oxygen or air, advantageously by a sparger, in amount sufficient to maintain some of the iron chelate in the ferric chelate form. Of these oxidants, air is preferred, since it does not substantially affect pH and it introduces no extraneous matter.

The ferric chelates of polycarboxylic acid chelating agents useful in the practice of the present method are advantageously made by reacting iron, iron oxide or hydroxide or magnetite with a polycarboxylic acid chelating agent which has been adjusted to an alkaline pH up to about 10 with ammonia and/or an amine as stated above or with a mixture of ammonia and/or an amine and an alakali metal hydroxide, in proportions as specified, so than an average of not more than one free carboxylic acid group remains per mole of chelating agent, at least about half of the carboxylic acid groups of the chelating agent are in the ammonium or amine salt form and provided that an average of not more than half of the carboxylic groups are in the alkali metal salt form. Alternatively, the corresponding ferrous chelates are made and oxidized, at least partially to the ferric chelate form in the manner previously described, advantageously in use. It is not required that pure ferric and/or ferrous chelates be used. On the contrary, a commercially attractive iron chelate-chelating agent solution can be prepared by dissolving iron-containing scale from ferrous surfaces, e.g., those of oxide scaled ferrous boiler tubes, by the reaction with an aqueous solution of a polycarboxylic acid chelating agent adjusted to an alkaline pH with ammonia and/or an amine or mixture thereof or with ammonia and/or an amine and with an alkali metal hydroxide, thereby forming iron chelate containing both ferrous and ferric chelate. Such a method is described in copending U.S. patent application Ser. No. 296,464, filed July 22, 1963 now U.S. Pat. No. 3,308,065.

The more preferred ammonium and/or amine salts whose ferric chelates are used in the process of this invention are those of the APAPAAs of the formula $$(HOOCCH_2)_2N[(CH_2)_nNCH_2COOH]_mCH_2COOH$$

where n and m may each independently be 1, 2, 3 or 4, up to two of the carboxymethyl groups may be replaced with a $\beta$-hydroxyethyl group and one or more of the carboxymethyl groups may be replaced by carboxyethyl groups.

Since no two ferrous surfaces are likely to have the same amount of copper plated out thereon, it is advantageous that the copper-dissolving ferric chelate-containing solutions can be varied in concentration. The stoichiometry of polycarboxylic chelating agents is well-known and can be used to calculate the requirements for copper solution. In the case of EDTA, for instance, one mole is required to solvate one mole of copper. Thus, as the plated copper is oxidized to copper ions, it reacts with free chelating agent present as a salt or as an iron chelate.

The degree or precent of "spentness of iron chelate-chelating agent solution is defined by:

$$\frac{\text{Weight iron-complexed chelating agent}}{\text{Weight free chelating agent} + \text{Weight iron-complexed chelate agent}} \times 100$$

Free chelating agent is determined analytically by a standard colorimetric or visual titration with strontium chloride to a constant turbidity after first filtering the sample solution. From this analysis, the percent by weight of unchelated chelating agent can be determined. Dissolved copper is analytical determined by a chlorimetric or visual determination using diethyldithiocarbamate sodium salt as follows. Transfer 5 ml. of sample solution to a 250 ml. volume flask and dilute to volume with water. Mix solution and transfer 5 ml. thereof to a beaker or flask. Add 1 ml. of aqueous one percent diethyldithiocarbamate sodium salt and dilute to exactly 200 ml. volume with 2B ethanol. Mix solution thoroughly and take a reading on a colorimeter or take frequent samples and use the previous sample as a comparative blank to a constant visual end point. Total dissolved iron and copper can be determined by X-ray emission spectroscopy.

Most generally, optimum conditions for the removal of plated copper from ferrous surfaces involve (1) a temperature of about 140°-150° F.; (2) a ca. 70-90 percent spent solution, i.e., ca. 70-90 percent of the total chelating agent is complexed with iron; (3) air at an average rate of 0.004 c.f.m./gal. of copper-dissolving solution bubbled through the copper-dissolving solution for about two hours, or, if at a lower rate, then for a proportionately longer time.

It is necessary that magnetite be completely removed from the ferrous metal surfaces, e.g., of boiler tubes, according to a procedure previously indicated.

Degree of spentness determines the corrosion rate at any given temperature. The rate can be modified with iron-oxidation inhibitors. At each temperature, there is a degree of spentness above which there is no further corrosion. At about 140° F., it is about 85 percent spentness, and at about 180° F., it is about 88 weight percent spentness, in the latter case, if ca. 0.05 weight percent thioethylamine iron-oxidation inhibitor is present. At 140° F., the degree of spentness can be reduced to 67 percent without any practical difference in corrosion rate. Theoretically, a solution containing more ferrous EDTA should require more oxygen. The efficiency of copper oxidation is increased, however, and the same amount or less air is required to oxidize the copper in a more highly spent solution.

If the solution is 67 percent spent or more, no iron oxidation inhibitor is required at 140° F. At 160° or 170° F., the solution should be 91 percent or more spent if no iron inhibitor or only an inhibitor as disclosed in U.S. Patent 3,077,454, is used.

The solubilized copper appears to be stabilized by the formation of cupric chelate. Therefore, in highly spent solutions, the stripping of copper is accompanied by a reduction in the dissolved iron to give a colloidal ferric hydroxide precipitate.

After plated copper and iron oxide are removed from the treated ferrous surfaces, rising is accomplished, e.g., by draining the boiler and refilling with water, all with air agitation. This facilitates the removal of suspended undissolved solids and causes better rinsing. Finally, the rinse water is drained off. If the magnetite is not completely removed, small areas of copper are protected from oxidation. In contact with air and water, these areas develop tiny "ant hills" of corrosion products, i.e., red rust.

The following examples describe completely representative specific embodiments and the best mode contemplated by the inventors of practicing the invention. They are not to be taken as limiting the invention other than as defined in the claims. Parts and percentages therein are given by weight.

EXAMPLE 1

A formulated spent solution of ammoniated EDTA was prepared by adding iron powder, in amount sufficient to saturate, to an aqueous 7.6 weight percent solution of ammoniated EDTA originally adjusted to a pH of about 9 with free ammonia and maintained at a reaction temperature of about 95° C. for 30 minutes in the presence of a nitrogen atmosphere so that the ferrous chelate of EDTA was formed. This solution was used to prepare a series of 3.8 percent total EDTA solutions having various percentages of spentness, e.g., by mixing with ammoniated EDTA adjusted to a pH of about 9 with free ammonia and with water, the percent of spentness being measured as described above. About one-half gallon of such solutions, some of them modified with a small percentage, up to ca. 0.1 weight percent of an iron-oxidation inhibitor, were then placed in a simulated high pressure boiler containing 2.3-2.5 grams of plated copper on a square foot of inside surface. Simulated boiler heaters were turned on to give various operating temperatures. Until a temperature equilibrium was reached, a constant flow of nitrogen through the simulated boiler was maintained to get circulation and exclude air. The nitrogen purge was then changed to air, using a pressure regulator and a valve to meter air through a coarse frit at the bottom of the boiler tubes. Time and rate of air flow were measured. The solutions were sampled for subsequent iron analysis, total iron and copper being determined by X-ray emission spectroscopy. One or more steel coupons were suspended in the boiler tubes for corrosion data.

At pre-determined times, the steel coupons were removed and dried for determination of corrosion data and limited samples of the aqueous solutions were taken. At the completion of each run, heat was discontinued and the solution was drained from the bottom of the boiler. Distilled water was then added and the boiler tubes were air agitated for several minutes. The rinse water was drained and the boiler tubes removed and examined. Operational data and results are summarized in the following table.

TABLE I

SUMMARY OF AIR-BLOWING DATA

| Run No.: | Inhibitor[1] | Percent A. EDTA Spent[2] | Temp., °F. | Air-Blow Total, min. | Air-Blow C.F.M. | Air-Blow Required Mins.[3] | Copper Avg., mils | Copper Percent Stripped |
|---|---|---|---|---|---|---|---|---|
| 1 | A-124 plus ThEA | 88 | 180 | 40 | .07 | 9 | .29 | 100 |
| 2 | " | 89.5 | 180 | 40 | .035 | 18 | .18 | 100 |
| 3 | " | 98.5 | 180 | 40 | .035 | 19 | .29 | 100 |
| 4 | " | 91 | 180 | 65 | .004 | 191 | .19 | 100 |
| 5 | " | 83 | 140 | 125 | .004 | 156 | .27 | 100 |
| 6 | A-124 | 70 | 140 | 180 | .004 | 162 | .29 | 100 |
| 7 | A-124 | 67 | 140 | 180 | .004 | 162 | .24 | 100 |
| 8 | A-124 | 67 | 140 | 210 | .004 | 181 | .47 | 100 |
| 9 | A-124 | 85 | 140 | 40 | .035 | 21 | .47 | 100 |
| 10 | A-124 | 90 | 140 | 40 | .035 | 18 | .30 | 100 |
| 11 | A-124 | 91.0 | 180 | 40 | .035 | 22 | .27 | 100 |
| 12 | A-124 | 90 | 160 | 40 | .035 | 23 | .25 | 100 |
| 13 | A-124 | 79 | 80 | 80 | .035 | | .25 | 100 |
| 14 | A-124 | 68.5 | 140 | 240 | .004 | | | 100 |
| 15 | No inhibitor | 67.0 | 140 | 30 | .035 | | | 100 |
| 16 | " | 70.0 | 140 | 40 | .035 | | .30 | 99+ |
| 17 | " | 86.0 | 180 | 40 | .035 | | .30 | 100 |
| 18 | " | 70.0 | 140 | 30 | .035 | | | 100 |
| 19 | " | 82.0 | 180 | 40 | .035 | | | 100 |
| 20 | " | 90.2 | 180 | 40 | .035 | | | 100 |
| 21 | " | 86.5 | 180 | 40 | .035 | | | 100 |
| 22 | " | 81.2 | 145 | 120 | .035 | | | 100 |

| Run No.: | Final Conc. in Solution Percent Cu | Final Conc. in Solution Percent Fe | (Theoretical) $O^2$ Required (lb. moles) | (Theoretical) $O^2$ Used | (Theoretical) $O^2$ Percent | Corrosion Rate, lbs./ft.$^2$/day |
|---|---|---|---|---|---|---|
| 1 | .13 | .75 | .00035 | .00148 | 422 | None |
| 2 | .11 | .78 | .00034 | .00074 | 217 | None |
| 3 | .16 | .73 | .00035 | .00074 | 212 | None |
| 4 | .10 | .92 | .00041 | .00014 | 34 | None |
| 5 | .12 | .72 | .00034 | .00027 | 80 | .0005 |
| 6 | .14 | .66 | .00031 | .00038 | 122 | .00034 |
| 7 | .14 | .66 | .00031 | .00038 | 122 | .00013 |
| 8 | .22 | .52 | .00037 | .00044 | 116 | .00005 |
| 9 | .18 | .63 | .00038 | .00074 | 188 | .0002 |
| 10 | .12 | .81 | .00033 | .00074 | 224 | None |
| 11 | .13 | .77 | .00040 | .00074 | 185 | .0054 |
| 12 | .10 | .88 | .00043 | .00074 | 172 | None |
| 13 | .072 | .63 | .00029 | .00148 | 510 | None |
| 14 | | | | | | None |
| 15 | | .59 | | | | |
| 16 | | | | | | None |
| 17 | | | | | | .0189 |
| 18 | | | | | | None |
| 19 | | | | | | .0330 |
| 20 | | | | | | .0089 |
| 21 | | | | | | .0403 |
| 22 | .21 | .62 | | | | .0233 |

[1]A-124, an iron-oxidation inhibitor disclosed in U.S. Pat. No. 3,077,454, is used in amount of 0.1%. ThEA is thioethylamine used in amount of 0.05%.
[2]Ammoniated EDTA, pH ca. 9.
[3]The calculated theoretical no. of mins. at the designated flow rate to convert the ferrous EDTA to ferric EDTA and $Cu^{\circ}$ to Cu ion.

Elemental analysis of the solutions in runs 1, 2 and 3 indicated that the copper was being complexed by the EDTA. In the case of highly spent solvent (98.5 percent) the formation of ferric hydroxide was obvious. In other runs, the colloidal sediment could only be detected by the difference in iron analysis in filtered and unfiltered solutions.

Free ammonia content is not critical. At the completion of run 3, for example, the pH was almost neutral.

Runs 9 and 10 established the corrosion rate at 140° F. when A-124 was the only inhibitor employed. The data indicate that a spentness of 67 percent gave a negligible iron corrosion rate.

Run 13 indicated that, although there was no iron corrosion at 80° F. and 79 percent spentness, the copper stripping rate was slow.

EXAMPLE 2

In accordance with the method described in Example 1, the following named polycarboxylic acid chelating agents were prepared as 80 percent spent solutions and at about pH 9.3. The solutions (each containing 3.8 percent chelating agent on an unreacted basis) were tested at 140° F. to remove copper-containing scale from ferrous surfaces. The scale was about 0.25 mil in thickness. Air was bubbled through the "solvent" at the rate of 0.035 c.f.m./gal. during the cleaning. The following data show the comparative times required in each instance to attain complete removal of the scale from the ferrous surfaces. Analytical procedures were the same as in Example 1.

| Run No.: | Polycarboxylic Acid | Time to Strip Off 100% of Scale, mins. |
|---|---|---|
| 1 | DTPA | 7 |
| 2 | NHEDTA | 20 |
| 3 | NTA | 15 |
| 4 | EDTA | 10 |
| 5 | Diammonium disodium EDTA | 6 |

EXAMPLE 3

The effect of EDTA concentration on the copper-stripping efficiency of the system was tested by preparing, as 80 percent spent, a 38 percent ammoniated EDTA solution at pH 9.3. Several dilutions of this solution were prepared and maintained at 140° F. while air was bubbled through the solution in contact with a 0.25 mil copper-scale on a ferrous surface.

| Conc. EDTA, percent: | Copper-strip |
|---|---|
| 38 | Yes. |
| 4 | Yes. |
| 2 | Yes. |
| 0.5 | Yes. |
| 0.25 | Partial. |

At the 0.25 percent level, corrosion of the substrate was accelerated at stress areas.

EXAMPLE 4

The following listed amines have been found to be operable in the practice of this invention for the purpose of adjusting the pH to the proper range and thereby forming the salts or partial salts of polycarboxylic acids and/or their partial salts, thereafter "spending" at least a portion of the so-formed solution of chelating agent by adding iron to form iron chelate. These highly spent solutions are operable in removing copper-containing scale from ferrous surfaces while having little or no corrosive effect on the substrate, they also gave a passivated ferrous surface.

| Amines: | Used with: polycarboxylic acid |
|---|---|
| Ethanolamine | EDTA. |
| Ethylamine | EDTA. |
| Ethylenediamine | EDTA. |
| Diethylenetriamine | EDTA. |
| Pentaethylenehexamine | EDTA. |
| Dimethylamine | EDTA. |

-continued

| Amines: | Used with: polycarboxylic acid |
|---|---|
| Trimethylamine | EDTA. |
| Ethyleneimine | EDTA. |
| Ethanolamine | Ethylenediaminetetra-propionic acid. |
| Ethylenediamine | N,N-di-(β-hydroxyethyl) glycine. |
| Ammonia | Tetramethylenediamine-N,N,N',N'-tetraacetic acid. |
| Ammonia | (2-hydroxyethylimino) diacetic acid. |

What is claimed is:

1. A process for removing copper from a ferrous metal surface containing copper thereon by contacting said surface with an aqueous alkaline solution wherein the solution employed contains as an essential constituent at least one member of the group consisting of ferric chelates of [polycarboxylic] *alkylene polyamine polyacetic* acid chelating agents and mixtures of ferric and ferrous chelates of [polycarboxylic] *alkylene polyamine polyacetic* acid chelating agents in amount sufficient and for a time sufficient at a reaction temperature above about 68° F. and up to about 300° F., to dissolve said copper, *wherein said solution may also contain a salt of the group consisting of ammonium, amine, and hydroxyalkylamine salts of alkylene polyamine polyacetic acid chelating agents.*

[2. A process as claimed in claim 1 wherein the said solution may also contain a salt of the group consisting of ammonium, amine and hydroxyalkylamine salts of polycarboxylic acid chelating agents.]

3. A process as claimed in claim [2] *1* wherein the total iron chelate originally present ranges between about 60 and about 100 weight percent of total salt form and iron chelate and the solution originally contains a total of between ca. 0.5 weight percent and up to a saturated solution of salt form and iron chelated chelating agent.

4. A process as claimed in claim 3 wherein some iron chelate is maintained in the ferric form by the addition of a water-soluble compatible oxidizing agent.

5. A process as claimed in claim 3 wherein some iron chelate is maintained in the ferric form by bubbling air through said aqueous alkaline solution.

[6. A process as claimed in claim 3 wherein the iron chelate and chelating agent salt are those of ethylenediaminetetraacetic acid.]

7. A process as claimed in claim 3 wherein the reacted ferrous surface is rinsed with rinse water containing a water-soluble oxidant.

8. A process as claimed in claim 3 wherein the reacted ferrous surface is rinsed with rinse water while air is bubbled therethrough.

9. A process for removing copper from a ferrous metal surface containing copper thereon by contacting said surface with an aqueous alkaline solution wherein the solution contains as an essential constituent ammoniated ethylenediaminetetraacetic acid adjusted to a pH of about 9 with free ammonia and iron chelate thereof wherein the iron chelate originally present ranges between about 60 and ca. 100 weight percent of total salt form ethylenediaminetetraacetic acid and iron chelate thereof and the solution originally contains between about 0.5 weight percent and up to a saturated solution of total salt form and iron chelate of ethylenediaminetetraacetic acid while air is being bubbled therethrough at a reaction temperature above about 68° F. and up to about 300° F. in amount sufficient and for a time sufficient to dissolve said copper, removing said solution from said ferrous metal surface, contacting said surface with rinse water while bubbling air therethrough and removing said rinse water.

*10. A process for removing copper from a ferrous metal surface containing copper thereon by contacting said surface with an aqueous alkaline solution wherein the solution employed contains as an essential constituent at least one member of the group consisting of ferric chelates of ethylenediaminetetraacetic acid and mixtures of ferric and ferrous chelates of ethylenediaminetetraacetic acid in amount sufficient and for a time sufficient at a reaction temperature above about 68° F. and up to about 300° F. to dissolve said copper, wherein said solution may also contain a salt of the group consisting of ammonium, amine and hydroxyalkylamine salts of ethylenediaminetetraacetic acid and wherein the total iron chelate originally present ranges between about 60 and about 100 weight percent of total salt form and iron chelate and the solution originally contains a total of between ca. 0.5 weight percent and up to a saturated solution of salt form and iron chelated chelating agent.*

*11. The process of claim 10, wherein the reaction temperature ranges from about 140° to about 180° F.*

*12. The process of claim 11, wherein at least 67 percent of the chelating agent is complexed with iron.*

*13. The process of claims 11 or 12 wherein the salt consists of the ammonium salt of ethylenediaminetetraacetic acid.*

*14. The process of claim 13 wherein the pH of the solution is in excess of 7 and up to about 10.*

*15. The process of claim 10 wherein the pH of the solution is in excess of 7 and up to about 10.*

*16. The process of claim 1 wherein said reaction temperature ranges from about 140° F. to about 180° F.*

*17. The process of claim 16 wherein at least 67 percent of the chelating agent is complexed with iron.*

*18. The process of claim 16 or 17 wherein the salt consists of an ammonium salt of alkylene polyamine polyacetic acid chelating agent.*

*19. The process of claim 17 wherein the pH of the solution is in excess of 7 and up to about 10.*

*20. The process of claim 16 wherein the pH of the solution is in excess of 7 and up to about 10.*

*21. The process of claim 1 wherein the chelate is a compound corresponding to the formula*

$(HOOCCH_2)_2N[(CH_2)_nNCH_2COOH]_mCH_2COOH$

*wherein n and m are each independently 1, 2, 3 or 4 and up to two of the carboxymethyl groups may be replaced with a β-hydroxyethyl group and one or more of the carboxymethyl groups may be replaced with a carboxyethyl group.*

*22. The process of claim 21 wherein the solution may also contain an ammonium salt of said chelate.*

*23. The process of claim 10 wherein said salt consists of the ammonium salt of ethylene diaminetetraacetic acid said reaction temperature ranging between about 140° F. to 180° F. and wherein some iron chelate is maintained in the ferric form by the addition of a water soluble compatible oxidizing agent.*

*24. The process of claim 23 wherein the solution also contains some chelating agent which is not chelated with iron.*

*25. The process of claims 23 or 24 wherein air is employed as the oxidant.*

*26. The process of claims 23 or 24 wherein an alkali metal nitrite is employed as the oxidant.*

*27. The process of claim 10 wherein said ferrous metal surface also contains iron oxide scale wherein said iron oxide is first dissolved with an alkaline solution of the ammonium salt of ethylene diaminetetraacetic acid, and the copper-containing metal surface is then contacted with the solution obtained from the removal of the iron oxide at a temperature of about 140° F. to 180° F., said solution containing from 60 to 100 percent of the ammonium salt in the form of iron chelate while adding to such solution a water soluble compatible oxidizing agent to maintain some of said iron chelate in the ferric form said solution having a pH within the range in excess of 7 and up to about 10.*

*28. The process of claim 27 wherein the oxidant comprises at least air which is bubbled through the copper-dissolving solution.*

* * * * *

UNITED STATES PATENT AND TRADEMARK OFFICE

CERTIFICATE OF CORRECTION

PATENT NO. : Reissue 30714

DATED : Aug. 18, 1981

INVENTOR(S) : Lester W. Harriman, et al.

It is certified that error appears in the above—identified patent and that said Letters Patent is hereby corrected as shown below:

Col. 2, line 1, change "N-hydoxye-" to --N-hydroxye- --.

Col. 2, line 62, change "alakali" to --alkali--.

Col. 2, line 63, change "than", first occurrence, to --that--.

Column 9, Claim 10, line 21, change "hydroxyalkylamine" to --hydroxylalkylamine--.

Signed and Sealed this

*Nineteenth* Day of *January 1982*

[SEAL]

*Attest:*

GERALD J. MOSSINGHOFF

*Attesting Officer*

*Commissioner of Patents and Trademarks*